United States Patent
Hunnicutt et al.

(10) Patent No.: US 6,494,804 B1
(45) Date of Patent: Dec. 17, 2002

(54) MICROVALVE FOR ELECTRONICALLY CONTROLLED TRANSMISSION

(75) Inventors: Harry A. Hunnicutt, Ann Arbor; Edward Nelson Fuller, Manchester, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 16 days.

(21) Appl. No.: 09/602,151

(22) Filed: Jun. 20, 2000

(51) Int. Cl.[7] .......................... F16H 31/00; E03B 31/00; E03C 31/00; F17D 31/00
(52) U.S. Cl. ...................... 475/127; 475/138; 137/625.6
(58) Field of Search ................................ 475/127, 140, 475/141, 156, 128, 138; 137/457, 625.6

(56) References Cited

U.S. PATENT DOCUMENTS

| | | | |
|---|---|---|---|
| 4,434,813 A | 3/1984 | Mon | 137/829 |
| 4,535,816 A | 8/1985 | Feder et al. | 137/625.6 |
| 4,581,624 A | 4/1986 | O'Connor | 357/26 |
| 4,628,576 A | 12/1986 | Giachino et al. | 29/157.12 |
| 4,647,013 A | 3/1987 | Giachino et al. | 251/331 |
| 4,821,997 A | 4/1989 | Zdeblick | 251/11 |
| 4,824,073 A | 4/1989 | Zdeblick | 251/11 |
| 4,826,131 A | 5/1989 | Mikkor | 251/129.17 |
| 4,828,184 A | 5/1989 | Gardner et al. | 239/590.3 |
| 4,857,034 A * | 8/1989 | Kouno et al. | 474/28 |
| 4,869,282 A | 9/1989 | Sittler et al. | 137/15 |
| 4,938,742 A | 7/1990 | Smits | 604/67 |
| 4,943,032 A | 7/1990 | Zdeblick | 251/11 |
| 4,959,581 A | 9/1990 | Dantlgraber | 310/328 |
| 4,966,646 A | 10/1990 | Zdeblick | 156/633 |
| 5,029,805 A | 7/1991 | Albarda et al. | 251/11 |
| 5,050,838 A | 9/1991 | Beatty et al. | 251/11 |
| 5,054,522 A | 10/1991 | Kowanz et al. | 137/625.33 |
| 5,058,856 A | 10/1991 | Gordon et al. | 251/11 |
| 5,061,914 A | 10/1991 | Busch et al. | 337/140 |
| 5,064,165 A | 11/1991 | Jerman | 251/101.1 |
| 5,065,978 A | 11/1991 | Albarda et al. | 251/129.6 |
| 5,069,419 A | 12/1991 | Jerman | 251/11 |
| 5,074,629 A | 12/1991 | Zdeblick | 335/14 |
| 5,082,242 A | 1/1992 | Bonne et al. | 251/129.01 |
| 5,096,643 A | 3/1992 | Kowanz et al. | 264/130 |

(List continued on next page.)

FOREIGN PATENT DOCUMENTS

| | | |
|---|---|---|
| DE | 4041579 A1 | 6/1992 |
| DE | 4101575 | 7/1992 |
| DE | 4417251 | 11/1995 |

(List continued on next page.)

OTHER PUBLICATIONS

Duffy, James E., *Modern Automotive Technology*, copyright 1994, p. 707.

(List continued on next page.)

*Primary Examiner*—Sherry Estremsky
*Assistant Examiner*—Tisha D. Lewis
(74) *Attorney, Agent, or Firm*—MacMillan, Sobanski & Todd, LLC (57) ABSTRACT

A microvalve device for controlling fluid flow in a fluid circuit. The microvalve device comprises a body having a cavity formed therein. An electronically controlled automatic transmission, comprising of an input shaft; an output shaft; a plurality of gears providing driving connection between the input shaft and the output shaft; one of a hydraulically operated brake band and a hydraulically operated clutch which is operable to effect a change in the gear reduction provided by the gears between the input shaft and the output shaft; a source of pressurized hydraulic fluid; and a microvalve device selectively operable to control passage of pressurized hydraulic fluid from the source to the one of a hydraulically operated brake band and a hydraulically operated clutch to operate the one of a hydraulically operated brake band and a hydraulically operated clutch.

20 Claims, 4 Drawing Sheets

U.S. PATENT DOCUMENTS

| | | |
|---|---|---|
| 5,131,729 A | 7/1992 | Wetzel ................ 303/113 AP |
| 5,133,379 A | 7/1992 | Jacobsen et al. ............. 137/83 |
| 5,142,781 A | 9/1992 | Mettner et al. ........ 29/890.121 |
| 5,161,774 A | 11/1992 | Engelsdorf et al. ........... 251/11 |
| 5,176,358 A | 1/1993 | Bonne et al. ............. 251/30.5 |
| 5,177,579 A | 1/1993 | Jerman ........................ 73/724 |
| 5,178,190 A | 1/1993 | Mettner ................ 137/625.65 |
| 5,179,499 A | 1/1993 | MacDonald et al. ........ 361/313 |
| 5,180,623 A | 1/1993 | Ohnstein .................... 428/209 |
| 5,197,517 A | 3/1993 | Perera ........................ 137/813 |
| 5,207,123 A | 5/1993 | Petersmann ................. 74/866 |
| 5,209,118 A | 5/1993 | Jerman ........................ 73/715 |
| 5,216,273 A | 6/1993 | Doering et al. ............ 257/419 |
| 5,217,283 A | 6/1993 | Watanabe ............... 303/113.2 |
| 5,238,223 A | 8/1993 | Mettner et al. ............ 251/368 |
| 5,244,537 A | 9/1993 | Ohnstein .................... 156/643 |
| 5,267,589 A | 12/1993 | Watanabe ............. 137/625.65 |
| 5,271,431 A | 12/1993 | Mettner et al. ............ 137/831 |
| 5,271,597 A | 12/1993 | Jerman ........................ 251/11 |
| 5,309,943 A | 5/1994 | Stevenson et al. ....... 137/625.5 |
| 5,325,880 A | 7/1994 | Johnson et al. ................ 137/1 |
| 5,333,831 A | 8/1994 | Barth et al. .................. 251/11 |
| 5,355,712 A | 10/1994 | Petersen et al. ............. 73/4 R |
| 5,368,704 A | 11/1994 | Madou et al. ......... 204/129.55 |
| 5,375,919 A | 12/1994 | Furuhashi ................ 303/119.1 |
| 5,400,824 A | 3/1995 | Gschwendtner et al. ..................... 137/625.28 |
| 5,417,235 A | 5/1995 | Wise et al. .................... 137/1 |
| 5,438,887 A | 8/1995 | Simmons .................... 74/335 |
| 5,445,185 A | 8/1995 | Watanabe et al. ...... 137/596.17 |
| 5,458,405 A | 10/1995 | Watanabe ................... 303/173 |
| 5,566,703 A | 10/1996 | Watanabe et al. ............. 137/1 |
| 5,785,295 A | 7/1998 | Tsai ............................ 251/11 |
| 5,909,078 A | 6/1999 | Wood et al. ................ 310/307 |
| 5,913,577 A | 6/1999 | Arndt ...................... 303/117.1 |
| 5,941,608 A | 8/1999 | Campau et al. .......... 303/113.4 |
| 5,954,079 A | 9/1999 | Barth et al. .................... 137/13 |
| 5,955,817 A | 9/1999 | Dhuler et al. .................. 310/3 |
| 5,970,998 A | 10/1999 | Talbot et al. ................... 137/1 |
| 5,994,816 A | 11/1999 | Dhuler et al. ............... 310/307 |
| 6,019,437 A | 2/2000 | Barron et al. ............ 303/113.1 |
| 6,023,121 A | 2/2000 | Dhuler et al. ................ 310/307 |
| 6,038,928 A | 3/2000 | Maluf et al. .................. 73/724 |
| 6,114,794 A | 9/2000 | Dhuler et al. ................ 510/307 |
| 6,199,575 B1 * | 3/2001 | Widner ........................ 137/227 |

FOREIGN PATENT DOCUMENTS

| | | |
|---|---|---|
| DE | 4422942 | 1/1996 |
| EP | 0250948 | 1/1988 |
| EP | 0261972 | 3/1988 |
| EP | 0499047 A1 | 8/1992 |
| GB | 2284026 | 5/1995 |
| WO | WO 99/16096 | 4/1999 |
| WO | WO 00/14415 | 3/2000 |

OTHER PUBLICATIONS

Eaton Corporation internet webpage http://www.autocontrols.eaton.com/powertrain body.html printed Sep. 1, 1999.

Delphi Automotive Systems product brochure, *Variable Bleed Solenoid (VBS) for Transmissions* copyright 1997.

Delphi Automotive Systems product brochure, *On/Off Transmission Solenoids*, copyright 1998.

IEEE Technical Digest entitled "Compliant Electro–thermal Microactuators", J. Jonsmann, O. Sigmund, S. Bouwstra, Twelfth IEEE International Conference on Micro Electro Mechanical Systems held January 17–21, 1999, Orlando, Florida, pp. 588–593, IEEE Catalog No.: 99CH36291C.

"A Silicon Microvalve For The Proportional Control Of Fluids" by K.R. Williams, N.I. Maluf, E.N. Fuller, R.J. Barron, D.P. Jaeggi, B.P. van Drieënhuizen, Transducers '99, Proc. $10^{th}$ International Conference on Solid State Sensors and Actuators, held Jun. 7–10, 1999, Sendai, Japan, pp. 18–21.

Noworolski et al., "Process for in–plane and out–of–plane single–crystal–silicon thermal microactuators," Sensors and Actuators A, Elsevier Science S.A., vol. 55, No. 1, (1996) 65–69.

Ayón et al., "Etching Characteristics and Profile Control in a Time Multiplexed ICP Etcher," Proc. Of Solid State Sensor and Actuator Workshop Technical Digest, Hilton Head SC, (Jun. 1998) 41–44.

Bartha et al., "Low Temperature Etching of Si in High Density Plasma Using $SF_6/O_2$," Microelectronic Engineering, Elsevier Science B.V., vol. 27, (1995) 453–456.

Fung et al., "Deep Etching of Silicon Using Plasma" Proc. Of the Workshop on Micromachining and Micropackaging of Transducers, (Nov. 7–8, 1984) 159–164.

Klaassen et al., "Silicon Fusion Bonding and Deep Reactive Ion Etching; A New Technology for Microstructures," Proc., Transducers 95 Stockholm Sweden, (1995) 556–559.

Linder et al., "Deep Dry Etching Techniques as a New IC Compatible Tool for Silicon Micromachining, " Proc., Transducers, vol. 91, (Jun. 1991) 524–527.

Petersen et al., "Surfaced Micromachined Structures Fabricated with Silicon Fusion Bonding", Proc. Transducers, vol. 91, (Jun. 92) 397–399.

Yunkin et al., "Highly Anisotropic Selective Reactive Ion Etching of Deep Trenches in Silicon", Microelectronic Engineering, Elsevier Science B.V., vol. 23, (1994) 373–376.

* cited by examiner

MICROVALVE FOR ELECTRONICALLY CONTROLLED TRANSMISSION

BACKGROUND OF THE INVENTION

This invention relates in general to semiconductor electromechanical devices, and in particular to a microvalve device for controlling an automatic transmission.

MEMS (MicroElectroMechanical Systems) is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports. Co-pending U.S. patent application Ser. No. 09/532,604, entitled "Pilot Operated Microvalve Device", describes a microvalve device consisting of an electrically operated pilot microvalve and a pilot operated microvalve who position is controlled by the pilot microvalve.

In addition to generating a force sufficient to move the displaced member, the actuator must generate a force capable of overcoming the fluid flow forces acting on the displaceable member that oppose the intended displacement of the displaced member. These fluid flow forces generally increase as the flow rate through the fluid ports increases.

SUMMARY OF THE INVENTION

The invention relates to an electronically controlled automatic transmission and a microvalve device suitable for controlling fluid flow in a fluid control circuit of an electronically controlled automatic transmission. The electronically controlled automatic transmission includes an input shaft, an output shaft, and a plurality of gears providing driving connection between the input shaft and the output shaft. The electronically controlled automatic transmission further includes at least one hydraulically operated component, such as a hydraulically operated brake band, or a hydraulically operated clutch, which is operable to effect a change in the gear reduction provided by the gears between the input shaft and the output shaft. A source of pressurized hydraulic fluid is provided to operate the hydraulically operated components of the electronically controlled automatic transmission. A microvalve device according to the invention is selectively operable to control passage of pressurized hydraulic fluid from the source to the hydraulically operated component. The microvalve device, in a preferred embodiment, includes a pilot-operated valve for controlling and selectively preventing the flow of pressurized hydraulic fluid to the hydraulically operated component. The microvalve device also includes an electronically controlled pilot valve for controlling the flow of pressurized hydraulic fluid to the slider valve to control the operation of the slider valve.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
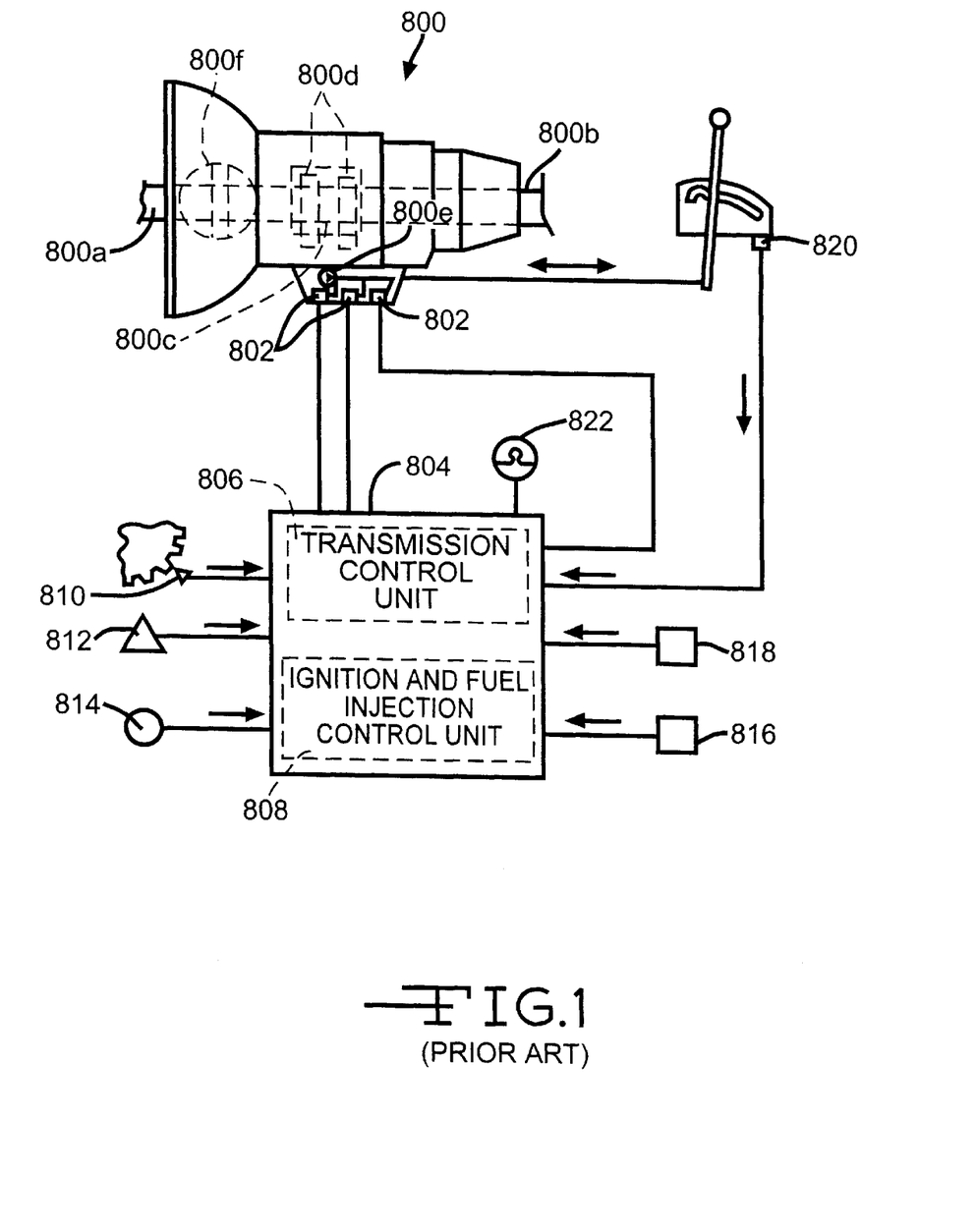
FIG. 1 is a schematic diagram of an electronically controlled automatic transmission that may suitably use microvalves of the present invention.

Referring to FIG. 1, there is shown a schematic diagram of an electronically controlled automatic transmission 800 having an input shaft 800a and an output shaft 800b. Automatic transmissions commonly use torque converter couplings with planetary-gear arrangements 800c that can provide a variety of gear reductions by locking or unlocking various elements of the planetary gear arrangement 800c. Locking and unlocking can be controlled by hydraulically operated components, such as clutches (or, in some models, brake bands) 800d. The clutches or brake bands 800d are selectively supplied pressurized hydraulic fluid from a pump 800e to actuate them. Additionally, a torque converter 800f may be "locked-up" in certain transmissions to improve efficiency of the transmission by supplying pressurized hydraulic fluid to the lock-up mechanism. Thus, the torque converter 800e is another hydraulically operated component of the electronically controlled automatic transmission 800.

The automatic transmission 800 is provided with a plurality of electronically controlled valves 802 for supplying pressurized hydraulic fluid (transmission fluid) for shifting and lock-up of the converter of the transmission 800 (not shown). An Electronic Control Unit (ECU) 804 for the vehicle includes a Transmission Control Unit 806 for controlling the operation of the valves 802 and may include an Ignition and Fuel Injection Control Unit 808. A plurality of sensors are provided which supply signals to the ECU 804, including an engine speed sensor 810, an air flow sensor 812, a throttle sensor 814, a kickdown sensor 816, an oxygen sensor 818, and a position sensor 820 for detecting the position of the gear selector lever. These sensor signals are processed by the ECU 804 to determine the proper control signals to generate. Typically, the ECU 804 is also provided with a fault indicator lamp 822 to warn the driver of the vehicle if a fault condition is detected.

The foregoing description of the electronically controlled automatic transmission 800 illustrated in FIG. 1 is conventional in the art and is adapted from *Marks' Standard Handbook for Mechanical Engineers, 9th Edition* (edited by Eugene A. Avallone and Theodore Baumeister III, copyright 1987 by McGraw-Hill, Inc., pp. 11–9 to 11–10) and *Modern Automotive Technology* (by James E. Duffy, copyright 1994 by The Goodheart-Willcox Company, Inc., p. 707). The structure and operation of the automatic transmission 800, other than the valves 802, will not be further discussed. The valves 802 in the prior art were conventional solenoid-operated valves, controlling pressures of up to several hundred pounds per square inch (p.s.i.). One example of a conventional valve designed for use in automatic transmissions is disclosed in U.S. Pat. No. 4,535,816 to Feder et al. Surprisingly, however, it is believed that microvalves may be utilized in place of conventional solenoid-operated valves of the prior art for the valves 802. Depending upon the specific design of the transmission 802 and the specific use of an individual valve 802, the microvalves utilized according to the invention may function in an "on-off" (i.e., fully opened-fully closed) manner, or as a proportional valve (i.e., a valve which controls flow/pressure in a continuously variable manner from a fully opened to a fully closed position). The previously mentioned co-pending U.S. patent application Ser. No. 09/532,604, describes a microvalve device consisting of an electrically operated pilot microvalve and a pilot operated microvalve who position is controlled by the pilot microvalve, which microvalve device can be operated in an on-off (fully opened-fully closed) manner. Valves made by microfabrication techniques are generally small compared to conventional valves. This promotes the inclusion of the ECU 804 (or at least the transmission control unit 806) and the valves 802 into one package that can be internal to the transmission 800. This also promotes the use of sensors integrally fabricated with microvalve devices (such as hydraulic fluid pressure sensors monitoring correct operation of the control devices of the automatic transmission in which such a package could be installed). These sensors could be used for open loop or closed loop control and monitoring of the automatic transmission 800.

Figure 2:
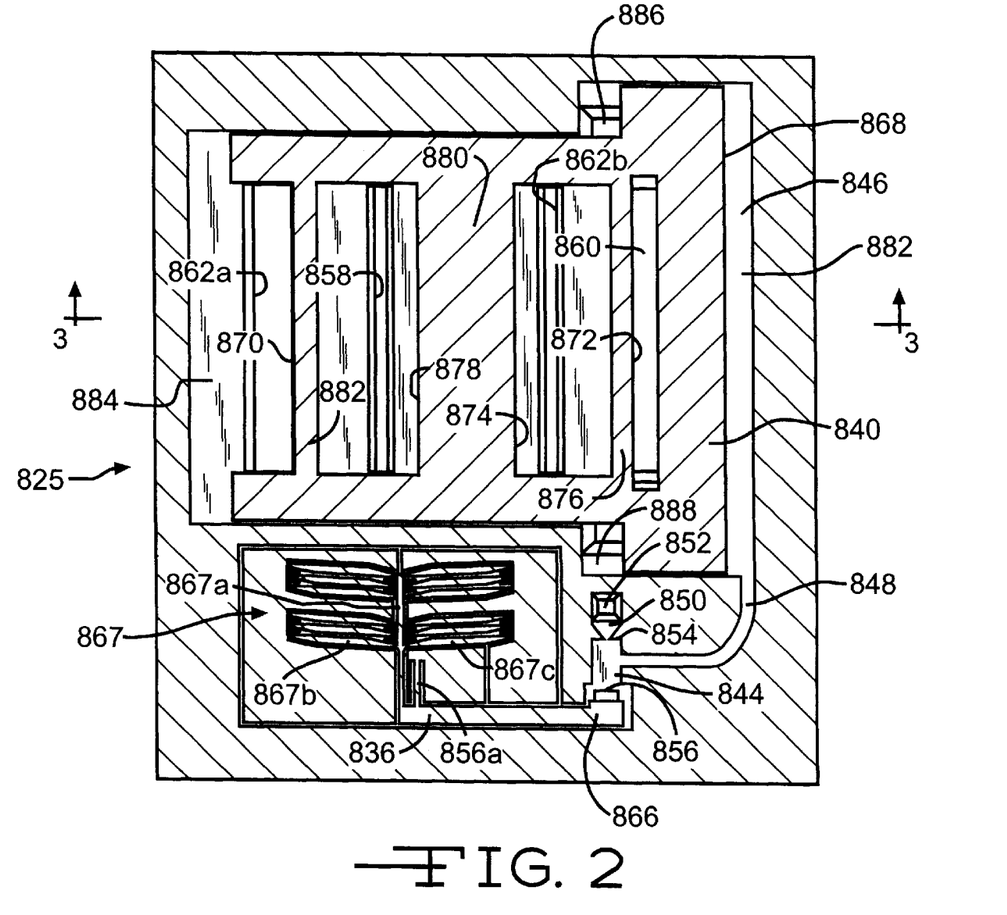
FIG. 2 is a top plan view of a embodiment of a microvalve device according to this invention which is suitable for use in the automatic transmission of FIG. 1 and which is partly broken away to show the movable components of the microvalve device.
Figure 3:
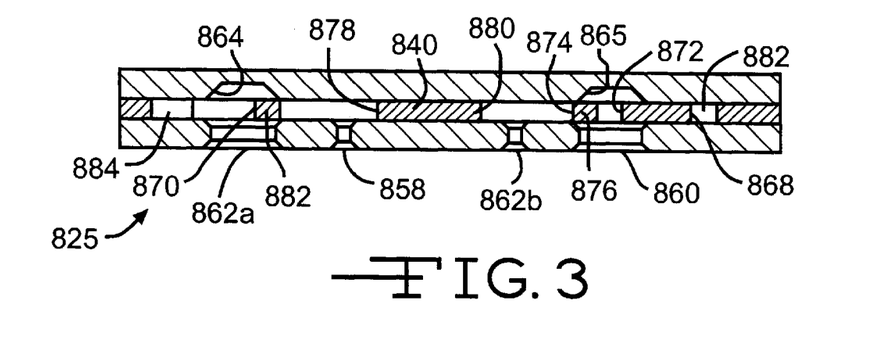
FIG. 3 is a sectional view of the microvalve device of FIG. 2, taken along the line 3—3.

FIG. 2 illustrates an embodiment of a microvalve device 825 according to this invention that is believed to be suitable for use as the valves 802 in the automatic transmission 800 of FIG. 1. FIG. 3 is a sectional view of the microvalve device 825 taken along the line 3—3 of FIG. 2. The microvalve device 825 is a pilot-operated microvalve device, having a pilot valve 836 and a pilot-operated slider valve 840. The microvalve device 825 includes a body 842 defining a first cavity 844 in which the pilot valve 836 is disposed, a T-shaped second cavity 846 in which the slider valve 840 is disposed, and a fluid passageway 848 connecting the first cavity 844 and the second cavity 846. A second fluid passageway 850 connects the first cavity 844 with an outlet port 852 which is adapted to be connected to a low pressure reservoir or fluid return (not shown) of the electronically controlled automatic transmission 800. An orifice 854 is disposed in the second fluid passageway 850. The orifice 854 restricts the flow of fluid from the first cavity 844 to the outlet port 852. An inlet port 856 is connected to the first cavity 844, and is adapted to be connected to a source of high-pressure fluid, that is, to the discharge of the pump 800e of the electronically controlled automatic transmission 800.

The body 842 also defines a number of ports connecting with the second cavity 846. These include a supply port 858, which is adapted to be connected to a source of high pressure fluid, that is, to the discharge of the pump 800e, to which the inlet port 856 is connected, and a tank port 860, which is adapted to be connected to a low pressure reservoir or fluid return (not shown) of the electronically controlled automatic transmission 800. Two load ports 862a and 862b are formed in the body, communicating with the second cavity 846, disposed on opposite sides of the supply port 856. The load ports 862a and 862b are adapted to be connected together, to supply pressurized fluid to a hydraulically operated component of the electronically controlled automatic transmission 800, such as the brake band or clutch 800d or the torque converter 800f of the electronically controlled automatic transmission 800. Additionally, as seen in FIG. 3, a trough 864 is formed in the upper surface of the first cavity 844 opposite the load port 862a, and another trough 865 is formed on the upper surface of the first cavity 844 opposite the tank port 860. As with the troughs described above, the troughs 864 and 833 help balance flow forces acting on the slider valve 840.

The pilot valve 836 is comprised of an elongate beam 866, which moves in a continuously variable manner between a first position, illustrated in FIG. 2, and a second position (not shown). The beam 866 is pivotally mounted to a fixed portion of the valve body 842 by a flexure beam 866a. In the second position, the beam 866 of the pilot valve 836 is positioned to cover the inlet port 856, essentially blocking flow into the first cavity 844 from the inlet port 856. Any pressurized fluid in the first cavity 844 bleeds off through the orifice 854 in the second passage 850 to the outlet port 852. As the beam 866 of the pilot valve 836 is moved toward the first, open, position the inlet port 856 is progressively uncovered, allowing faster flows of fluid from the inlet port 856 into the first cavity 844. The fluid thus admitted flows out the second passage 850, to cause a pressure differential to form as the fluid flows through the orifice 854, raising pressure in the first cavity 844. As the inlet port 856 is further opened, fluid flows even faster through the orifice 854, causing a larger pressure differential and further raising the pressure in the first cavity 844. Thus, it is clear that the pressure in the first cavity 844 can be controlled by controlling the rate of flow from the inlet port 856 through the first cavity 844, the orifice 854 and the second passageway 850 to the outlet port 852. Positioning the beam 866 controls the rate of flow of this fluid, and thus the pressure in the first cavity 844.

A valve actuator indicated generally at 867 positions the beam 866. The actuator 867 includes an elongated spine 867a attached to the beam 866. The actuator 867 further includes multiple pairs of opposing first ribs 867b and second ribs 867c. Each first rib 867b has a first end attached to a first side of the spine 867a and a second end attached to a fixed portion of the valve body 842. Similar to the first ribs 867b, each second rib 867c has a first end attached to a second side of the spine 867a and a second rib end attached to the fixed portion of the valve body 842. The ribs 867b, 867c are designed to thermally expand (elongate) and contract. Electrical contacts 867d (shown in FIG. 4) are adapted for connection to a source of electrical power to supply electrical current flowing through the ribs 867b and 867c to thermally expand the ribs 867b and 867c . The actuator 867 is adapted to be controlled by an electronic control unit such as the ECU 804 illustrated in FIG. 1.

The slider valve 840 is formed with an elongated body having a pair of oppositely disposed arms extending perpendicularly at a first end of the body so that the slider valve 840 is generally a T-shaped plate, having a first end face (or control face) 868 at a wider longitudinal end of the plate, and a second end face 870 at a narrow longitudinal end of the plate. The slider valve 840 defines three openings therethrough. A first opening 872, close to the first end face 868, is defined through the slider valve 840 to permit the fluid volume in the trough 865 to equalize with the pressure at the tank port 860, balancing forces acting vertically (as viewed in FIG. 3) on the slider valve 840. A second opening 874 through the slider valve 840 forms an internal volume that is always in communication with the load port 862*b*. A web 876 between the second opening 874 and the first opening 872 permits or prevents flow between the load port 862*b* and the tank port 860; in the illustrated position, the web 876 prevents flow between the load port 862*b* and the tank port 860. When the web 876 moves to the right (as viewed in FIGS. 2 and 3), a fluid pathway between the load port 862*b* and the tank port 860 is opened, venting any pressure present at the load port 862*b* to the low pressure reservoir connected to the tank port 860.

A third opening 878 through the slider valve 840 permits the fluid volume in the trough 864 to equalize with the pressure at the load port 862*a*, balancing forces acting vertically (as viewed in FIG. 3) on the slider valve 840. A web 880 between the second opening 874 and the third opening 878 prevents flow between the supply port 858 and the load port 862*b* in all positions of the slider valve 840. A final web 882 between the third opening 878 and the second longitudinal end face 870 permits or prevents flow between the supply port 858 and the load port 862*a*; in the illustrated position, the web 882 prevents flow between the supply port 858 and the load port 862*a*. When the slider valve 840 moves to the left (as viewed in FIGS. 2 and 3), a fluid pathway opens between the supply port 858 and the load port 862*a*, supplying pressurized fluid to the load connected to the load port 862*a*.

The slider valve 840 cooperates with the walls of the second cavity 846 to define a first chamber 882 between the first longitudinal end face 868 and the opposing wall of the second cavity 846. The first passageway 848 is in fluid communication with the first chamber 882 at all times. A second chamber 884 is defined between the second end face 870 and the opposing wall of the second cavity 846. The chamber 884 is in fluid communication with the load port 862*a* at all times. Additionally, two volumes 886 and 888 are defined between respective pairs of shoulders of the T-shaped plate forming the slider valve 840 and the shoulders of the T-shaped second cavity 846. The volumes 886 and 888 are in communication with the tank port 860 at all times. In this manner, a hydraulic lock of the slider valve 840 is prevented.

The area of the first end face 868 of the slider valve 840 is larger than the area of the second end face 870 of the slider valve 840. Therefore, when the pressures in the first and second chambers 882 and 884 are equal, the resultant unbalanced net force acting on the slider valve 840 will urge the slider valve 840 to the left (as viewed in FIGS. 2 and 3).

The inlet port 856 in the pilot valve 836 is relatively small, especially in comparison to the supply port 858 and the load port 862*a* of the pilot-operated slider valve 840. In operation, the beam 866 of the pilot valve 836 uncovers the inlet port 856, and fluid flows through the inlet port 856, the first cavity 844, the orifice 854, and the second passageway 850 to the outlet port 852. The inlet port 856 can act as an additional orifice in this flow path. Due to pressure drop through the orifice-like inlet port 856, it may not be possible to get the pressure in the first cavity 844 (and thus in the first chamber 882) up to the pressure at the outlet of the pump 800*e*. The pressure in the second chamber 884 may achieve a higher pressure (at or near pump outlet pressure) than may be achieved in the first chamber 882, owing to the larger openings of the supply port 858 and the load port 862 of the slider valve 840, and resultant low pressure drop when fluid flows through these ports. However, since the surface area of the first end face 868 is greater than the surface area of the second end face 870, the slider valve 840 can still be moved leftward (as viewed in FIGS. 2 and 3) even if the pressure in the first chamber 882, acting on the first end face 868, is less than the pressure in the second chamber 884.

More specifically, the inlet port 856, together with the pilot valve 836, forms a kind of variable orifice, the flow area of which varies with the position of the beam 866 of the pilot valve 836. The orifice 854 cooperates with the "variable orifice" formed by the pilot valve 836 to form a pressure divider circuit. The pressure divider circuit controls the pressure applied to the control face (the first end face 866) of the slider valve 840 according to the formula $$P_2 = P_1\left(\frac{A_1^2}{A_1^2 + A_2^2}\right)$$

where $P_1$ is the supply pressure to said pressure divider circuit (the pressure supplied from the pump 800*e* to the inlet port 856);

P2 is the pressure of the fluid in the first cavity 844 and thus, because of the fluid passageway 848 between the first cavity 844 and the first chamber 882, is the control pressure directed to the control face of the slider valve 840 (the first end face 868);

A1 is the opening area (flow area) of the upstream orifice of the pressure divider circuit, that is, the variable orifice formed by the pilot valve 836 and the inlet port 856; and A2 is the opening area (flow area) of the downstream orifice of the pressure divider circuit, that is, the flow area of the orifice 854.

Preferably the ratio of the area of the first end face 868 to the area of the second end face 870 of the slider valve 840 is such that the pressure in the chamber 884 (acting against the second end face 870) may be brought up to a pressure nearly equal to P1.

The slider valve 840 has three principal zones or positions of operation: a pressure increase position, a pressure hold position, and a pressure decrease position. As illustrated in FIGS. 2 and 3, the slider valve 840 is in a pressure hold position, that is, holding pressurized fluid on the load. If slider valve 840 moves rightward (as viewed in FIGS. 2 and 3), the slider valve 840 is in the pressure decrease position. This is accomplished when the ECU 804 commands the pilot valve 836 to close, by increasing electric current supplied to the actuator 867. The ribs of the actuator 867 expand, causing the beam 866 to pivot (bending the flexure beam 866*a*) and cover more of the inlet port 856. Flow decreases in the second passage 850 from the inlet port 856 to the outlet port 852. The pressure drop across the orifice 854 decreases. Pressure in the first cavity 844, the first passage 848 and the first chamber 882 also decreases. This results in an imbalance of the forces acting on the slider valve 840. The decreased force acting on the first end face 868 (due to the lowered pressure in the first chamber 882) is now less than the unchanged force acting on the second end face 870 due to the pressure in the chamber 884 (connected to the load). The force imbalance urges the slider valve 840 to the right (as viewed in FIGS. 2 and 3). The web 876 is thus moved rightward, permitting flow of pressurized fluid from the load, through the load port 862*b* and through the second opening 874 in the slider valve 840. From there, some of the flow passes directly out of the tank port 860, while some flow may pass up into the trough 865, over the top of the web 876, down through the first opening 872 and out the tank port 860. In this manner, pressure is released from the load and vented to the low pressure reservoir connected to the tank port 860. The slider valve 840 will move back to the pressure hold position when the pressure in the chamber 884 (acting through the load port 862*a*) is decreased sufficiently that forces acting on the slider valve 840 urge the slider valve 840 to move to the left (as viewed in FIGS. 2 and 3). With forces equalized, the slider valve 840 will stop in the pressure hold position. Thus, the pressure at the load (as sensed through the load ports 862*a* will be proportionate (in the illustrated embodiment, inversely proportionate) to the electrical signal (current) supplied to the actuator 867.

When the ECU 804 decreases current flow through the ribs of the actuator 867, the beam 866 of the pilot valve 836 pivots to uncover more of the inlet port 856. This results in a pressure increase in the first cavity 844 and the first chamber 882, while the pressure in the second chamber 884 remains constant. The slider valve 840 is moved leftward (as viewed in FIGS. 2 and 3) due to the resultant imbalance of forces acting on the slider valve 840. If the slider valve 840 was in the pressure decrease position, the leftward movement moves the slider valve back to the pressure hold position shown in FIGS. 2 and 3. If the ECU 804 further decreases current flow and causes the pilot valve 836 to open further, the pressure in the first chamber 884 further increases, urging the slider valve 840 further leftward (as viewed in FIGS. 2 and 3) into the pressure increase position. The web 870 is moved leftward, permitting flow of pressurized fluid from the supply port 858 through the opening 878 in the slider valve 840. From there, some of the flow passes directly out of the load port 862*a*, while some flow may pass up into the trough 864, over the top of the web 870, through the second chamber 884 and out of the load port 862*a*. In this manner, pressure is directed from the source of high-pressure fluid connected to the supply port 858 and applied to the load connected to the load port 862*a* (e.g., the hydraulically operated components of the electronically controlled automatic transmission 800).

It will be appreciated that the microvalve device 825 of this invention could be operated in a full open/full close manner by providing suitable zero current/maximum current signals (respectively) to the actuator 867. It will be further appreciated that the pilot valve 836 could be arranged so that the actuator 867 acted on the beam 866 between the pivoting connection provided by the flexure beam 866*a* and the end of the beam 866 covering and uncovering the inlet port 856. In such an embodiment, maximum current flow to the actuator 867 would result in an increasing pressure supplied to the associated hydraulically operated component of the electronically controlled automatic transmission 800, while zero current supplied to the actuator 867 would result in a decrease in pressure supplied to the associated hydraulically operated component.

While the microvalve device 825 has been described as including both the electronically controlled pilot valve 836 and the pilot-operated slider valve 840, it is anticipated that the pilot valve may be of different configuration than shown here, that the pilot operated valve may be of different configuration than shown here, or that, indeed, the microvalve device 825 could instead be equipped with an electronically controlled microvalve that directly controlled the flow of pressurized fluid from the pump 800*e* to the hydraulically operated components of the electronically controlled automatic transmission 800. Additionally, although not shown, it is also anticipated that various other micromachined and electronic components could be fabricated in the body 842 of the microvalve device 825. Examples of these components could include the Transmission Control Unit 806 or the entire ECU 804, additional micromachined valves to operate other hydraulically operated components of the electronically controlled automatic transmission 800, and a wide variety of sensors, including pressure sensors, position sensors, temperature sensors, and accelerometers.

Figure 4:
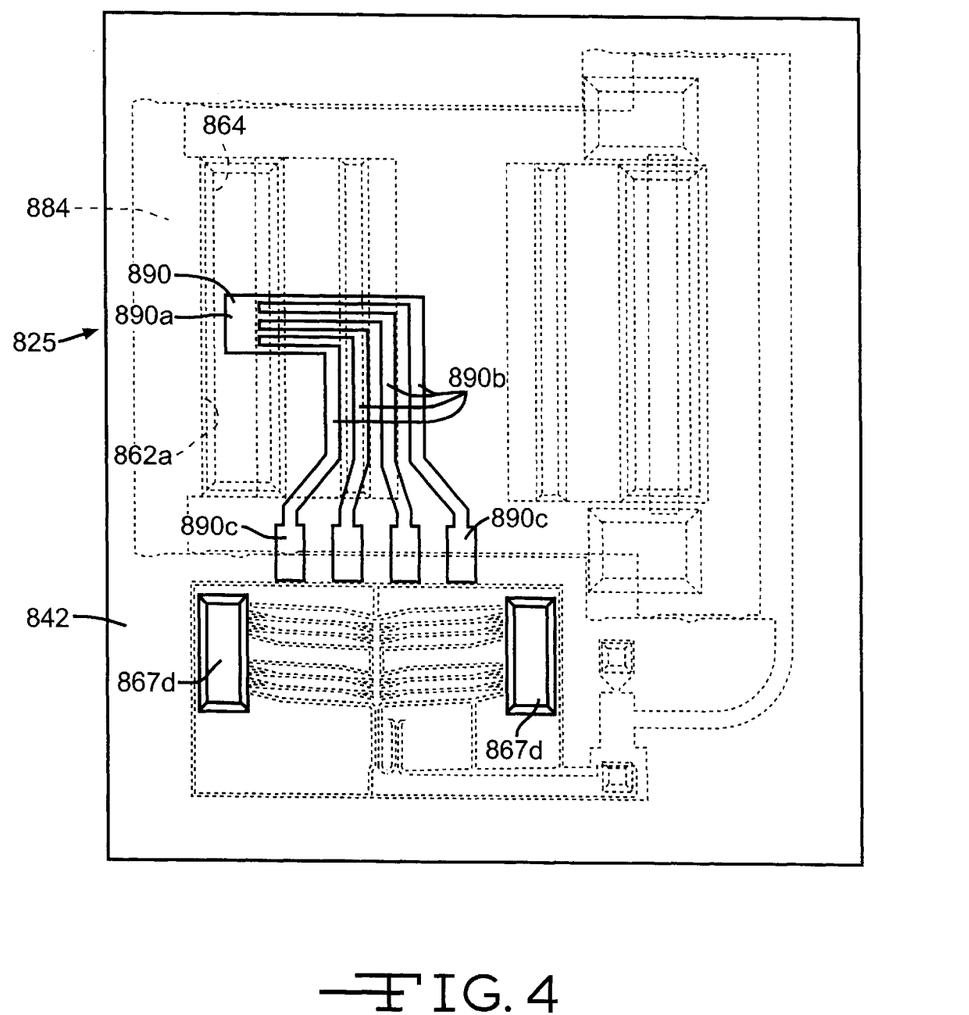
FIG. 4 is a top view of the microvalve device of FIG. 2, showing a pressure sensor affixed to an upper surface thereof.

For example, FIG. 4 illustrates a pressure sensor 890 fixed on the outside of the body 842 of the microvalve device. The pressure sensor 890 is a MEMS device. The pressure sensor 890 includes a metallic strain gauge 890*a* bonded to the body 842 in the region of the trough 864 opposite the load port 862*a*. The strain gauge 890*a*, and other portions of the pressure sensor, can be affixed to the body by any suitable means, including metallic plating or metal deposition. The body 842 has a relatively thin wall in this region, which bulges and collapses minutely as the pressure in the second chamber 884 increases and decreases. This movement of the body wall causes variations in the internal resistance of the strain gauge 890*a*. These variations can be monitored through a plurality of instrument leads 890*b* extending from the strain gauge 890*a* to pads 890*c* where control system wires can be attached. In this manner, the pressure sensor 890 is able to generate a signal representative of the pressure at the load port 862*a*.

Figure 5:
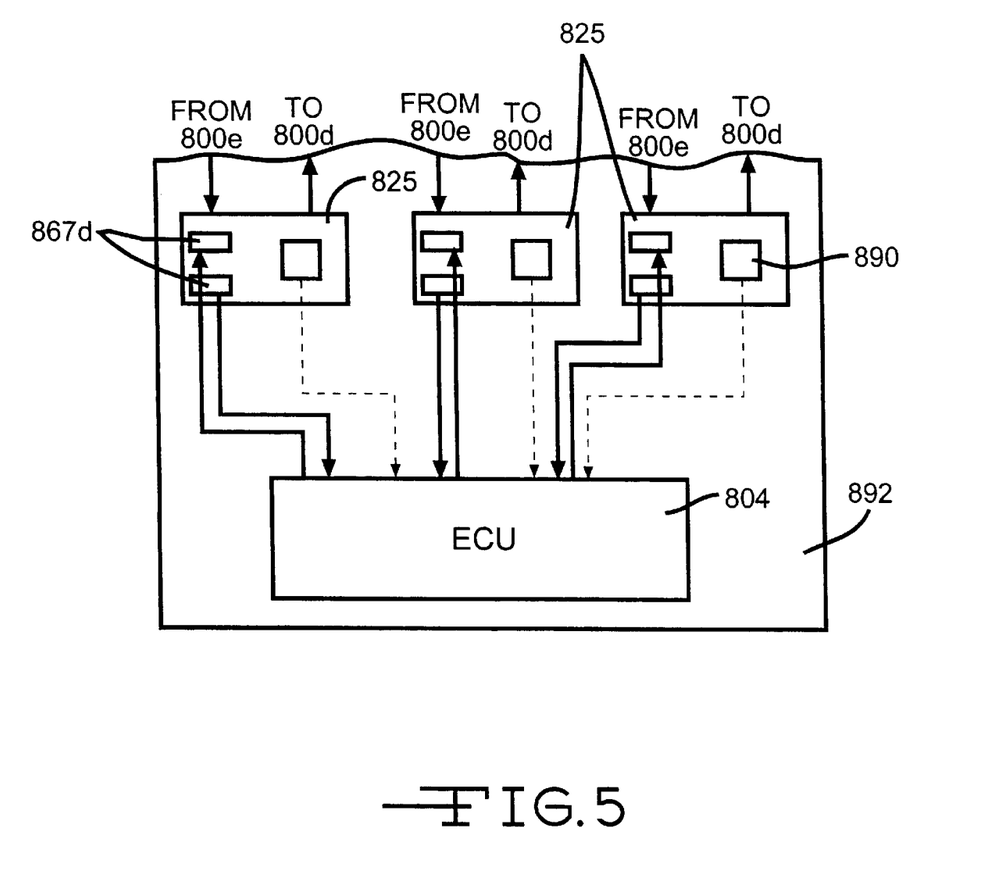
FIG. 5 is a partial schematic view of an arrangement of a plurality of microvalve devices of the type shown in FIG. 2 fixed to a common substrate, together with an Electronic Control Unit, which is also fixed to the common substrate.

Referring now to FIG. 5, a plurality of the microvalve devices 825 are shown schematically for controlling a plurality of hydraulically operated components 800*d*. As illustrated, each of the microvalve devices is supplied with pressurized fluid from the pump 800*e*. The microvalve devices 825 are electronically controlled by the ECU 804. Pressure sensors 890 are preferably provided on each of the microvalve devices 867*d* to provide a pressure signal to the ECU 804. Each of the microvalve devices 825 and the ECU 804 are mounted on a common substrate 892, which may be, for example, an electronic printed circuit board.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electronically controlled automatic transmission, comprising:

an input shaft;

an output shaft;

a plurality of gears providing driving connection between said input shaft and said output shaft;

one of a hydraulically operated brake band and a hydraulically operated clutch which is operable to effect a change in the gear reduction provided by said gears between said input shaft and said output shaft;

a source of pressurized hydraulic fluid; and a microvalve device selectively operable to control passage of pressurized hydraulic fluid from said source to said one of a hydraulically operated brake band and a hydraulically operated clutch to operate said one of a hydraulically operated brake band and a hydraulically operated clutch, wherein said microvalve device includes a micro-machined pilot valve and a micro-machined pilot-operated valve controlled by the operation of said pilot valve.

2. The automatic transmission of claim 1, wherein said pilot-operated valve is movable between a pressure increase position, a pressure maintain position, and a pressure decrease position to control passage of pressurized fluid from said source to said one of a hydraulically operated brake band and a hydraulically operated clutch.

3. An electronically controlled automatic transmission, comprising:
   an input shaft;
   an output shaft;
   a plurality of gears providing driving connection between said input shaft and said output shaft;
   at least one hydraulically operated component which is operable to effect a change in the gear reduction provided by said gears between said input shaft and said output shaft;
   a source of pressurized hydraulic fluid; and
   a microvalve device selectively operable to control passage of pressurized hydraulic fluid from said source to said hydraulically operated component, said microvalve device including a microvalve having an outlet in fluid communication with said hydraulically operated component, said microvalve being operable to control passage of pressurized hydraulic fluid from said source to said hydraulically operated component, said microvalve device further including a MEMS pressure detector for generating a signal indicative of a pressure of said fluid at said outlet, wherein said microvalve is a pilot operated valve, said electronically controlled automatic transmission further including a microvalve acting as a pilot valve for controlling the operation of said microvalve.

4. The electronically controlled automatic transmission of claim 3, wherein said pressure detector is fixed to said microvalve.

5. The electronically controlled automatic transmission of claim 3, further comprising a second hydraulically operated component, said second hydraulically operated component being in fluid communication with a second microvalve device for controlling the operation of said second hydraulically operated component, said second microvalve device and said microvalve device being mounted on a common substrate.

6. The electronically controlled automatic transmission of claim 3, wherein said pilot valve is thermally actuated.

7. The electronically controlled automatic transmission of claim 5, further comprising an Electronic Control Unit controlling the operation of said microvalve device and said second microvalve device, said Electronic Control Unit being mounted on said common substrate.

8. The electronically controlled automatic transmission of claim 6, wherein said pilot valve includes an actuator having a plurality of rib which thermally expand when heated by passing an electrical current therethrough to position a microvalve movable between a pressure increase position, a pressure maintain position, and a pressure decrease position to control passage of pressurized fluid from said source to said pilot operated valve.

9. A microvalve device for controlling fluid pressure in an electrically controlled automatic transmission comprising:

a valve body defining an inlet adapted to be connected to a source of pressurized fluid in an automatic transmission and defining an outlet adapted to be connected in fluid communication with a hydraulically operated component of the automatic transmission, said valve body further defining a pilot valve inlet adapted to be connected to the source of pressurized fluid and a fluid passage;

a pilot operated valve disposed between said inlet and said outlet, said pilot operated valve having a first position permitting pressurized hydraulic fluid to pass from said inlet to said outlet, and a second position preventing pressurized hydraulic fluid to pass from said inlet to said outlet, said pilot operated valve having a control face in fluid communication with said fluid passage, said pilot operated valve being operated between said first and second positions according to the pressure in said fluid passage; and a pilot valve disposed in said passage, said pilot valve being operable between a first position in which pressurized fluid is prevented from passing from said pilot valve inlet to said passage and a second position in which pressurized fluid is permitted to pass from said pilot valve inlet to said passage to increase pressure in said passage.

10. The microvalve device of claim 9, wherein said valve body further defines an pilot valve outlet port adapted to be connected to a low pressure reservoir of the automatic transmission, an orifice in said fluid passage between said pilot valve inlet and said pilot valve outlet port, and a second fluid passage providing the fluid communication between said fluid passage and said control face of said pilot operated valve, said second fluid passage being connected to said fluid passage.

11. The microvalve device of claim 9 further including a pressure divider circuit within said fluid passage.

12. The microvalve device of claim 9, further including a pressure detector generating a signal indicative of pressure at said outlet.

13. The microvalve device of claim 10, wherein said orifice is disposed in said fluid passage between said pilot valve and said pilot valve outlet port.

14. The microvalve device of claim 13, wherein said second fluid passage is connected to said fluid passage between said pilot valve and said orifice.

15. The microvalve device of claim 14, wherein said pilot operated valve has an elongated body with a pair of oppositely disposed arms extending perpendicularly at a first end of said body so that the pilot operated valve is generally T-shaped, said control face being an axial end face of said body at said first end of said body.

16. The microvalve device of claim 11, wherein said pressure divider circuit controls pressure applied to said control face according to the formula $$P_2 = P_1\left(\frac{A_1^2}{A_1^2 + A_2^2}\right)$$

where
   $P_1$=supply pressure to said pressure divider circuit;
   $P_2$=control pressure directed to said control face;
   $A_1$=opening area of an upstream orifice of said pressure divider circuit; and
   $A_2$=opening area of a downstream orifice of said pressure dividing circuit.

17. The microvalve device of claim 12, wherein said pressure detector is a MEMS strain gauge bonded to an outer surface of said valve body.

18. The microvalve device of claim 12, further including an Electronic Control Unit producing an electrical signal for controlling the position of said pilot valve, said signal indicative of pressure at solid outlet being provided to said Electronic Control Unit for closed loop control of said microvalve device.

19. The microvalve device of claim 18, wherein said Electronic Control Unit and said valve body are mounted on a common substrate.

20. A microvalve device for controlling fluid pressure, comprising:

a microvalve valve body defining an inlet adapted to be connected to a source of pressurized fluid and defining an outlet adapted to be connected in fluid communication with a hydraulically operated component, said valve body further defining a pilot valve inlet adapted to be connected to the source of pressurized fluid and defining a fluid passage;

a pilot operated microvalve disposed between said inlet and said outlet, said pilot operated microvalve having a first position permitting pressurized hydraulic fluid to pass from said inlet to said outlet, and a second position preventing pressurized hydraulic fluid to pass from said inlet to said outlet, said pilot operated microvalve having a control face in fluid communication with said fluid passage, said pilot operated microvalve being operated between said first and second positions according to the pressure in said fluid passage; and a pilot microvalve disposed in said fluid passage, said pilot microvalve being operable between a first position in which pressurized fluid is prevented from passing from said pilot microvalve inlet to said fluid passage and a second position in which pressurized fluid is permitted to pass from said pilot microvalve inlet to said fluid passage to increase pressure in said fluid passage.

\* \* \* \* \*